United States Patent [19]

Carney, Jr. et al.

[11] 4,397,591
[45] Aug. 9, 1983

[54] PNEUMATIC OUTLET CONTROL VALVE

[75] Inventors: John L. Carney, Jr., Lake St. Louis; Gary L. Vierck, St. Peters, both of Mo.

[73] Assignee: ACF Industries, Incorporated, New York, N.Y.

[21] Appl. No.: 256,344

[22] Filed: Apr. 22, 1981

[51] Int. Cl.$^3$ ............................................. B65G 53/40
[52] U.S. Cl. .................................... 406/131; 222/548
[58] Field of Search ...................... 406/128, 129, 131; 222/548

[56] References Cited

U.S. PATENT DOCUMENTS 3,194,420  7/1965  Kemp et al. ........................ 406/128
3,778,114  12/1973  Carney, Jr. et al. ................ 406/129

*Primary Examiner*—Jeffrey V. Nase
*Attorney, Agent, or Firm*—Henry W. Cummings

[57] ABSTRACT

In accordance with the present invention, in a pneumatic outlet a discharge tube is attached to sloped outlet walls having lips at their lower inner edges. A rotatable control valve is located within the discharge tube. The control valve is provided with a pattern of openings for metering flow of lading into the discharge tube and is arranged to reduce or eliminate pellets from becoming trapped in the valve opening. Preferably the metering contour includes a pattern of sharp edges and tapered recesses. The tapered recesses are arranged to guide pellets away from the valve opening. The sharp edges will shear the remaining pellets which are trapped in the metering opening, thus avoiding jamming the control tube. The control valve further comprises arcuate segment of less than 180°. With this arcuate segment any pellets trapped between the control valve and the wall of the tube tend to bend the control valve away from the lips and thus reduce any tendency for the control valve to become bound and unrotatable because the control valve abuts one of the lips.

15 Claims, 11 Drawing Figures

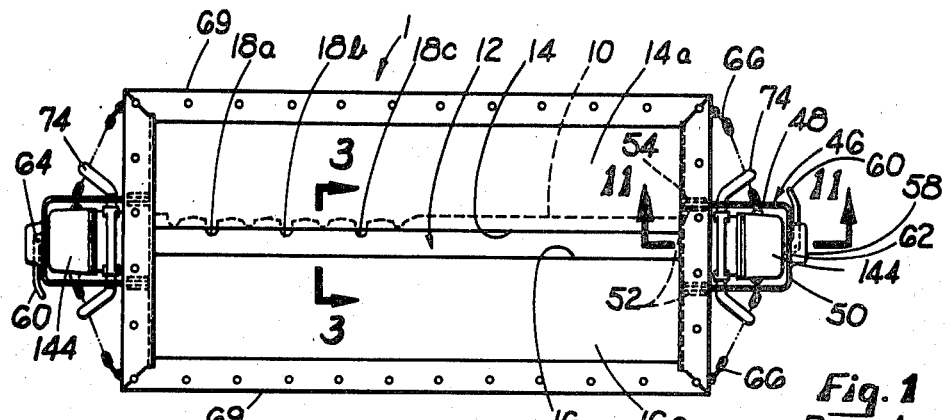
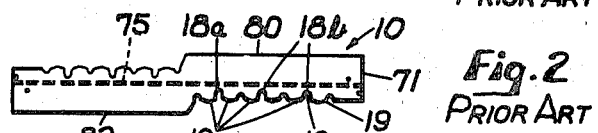
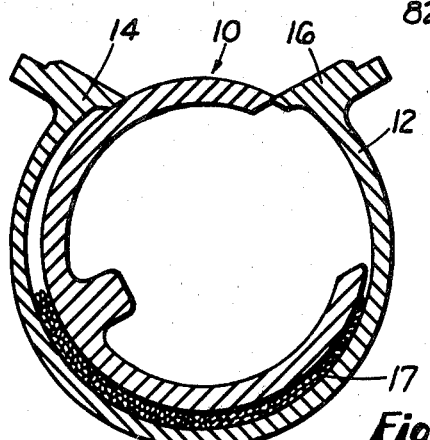
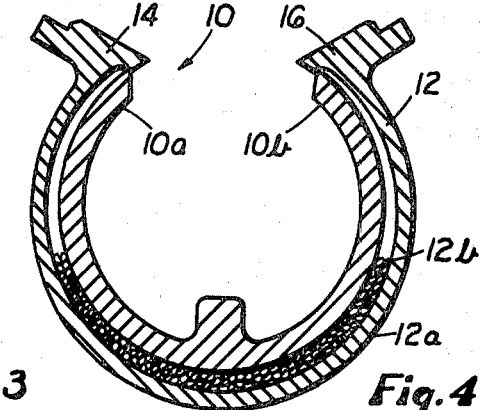
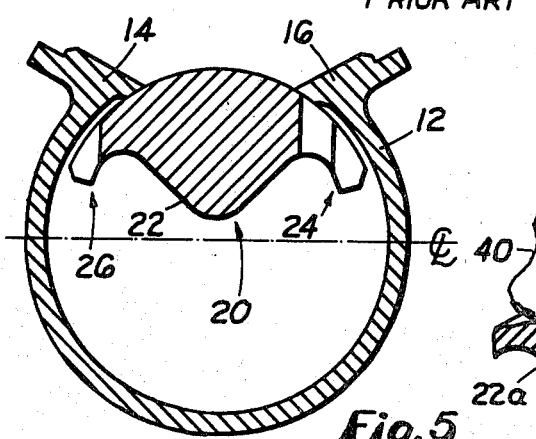
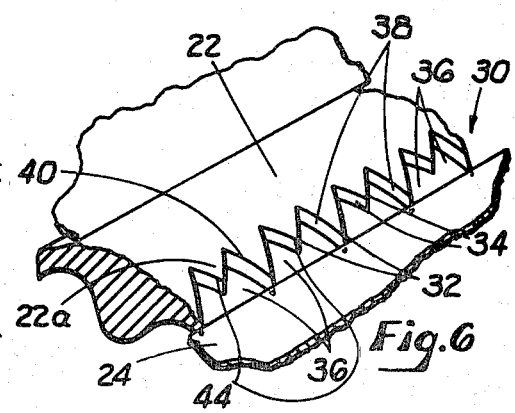

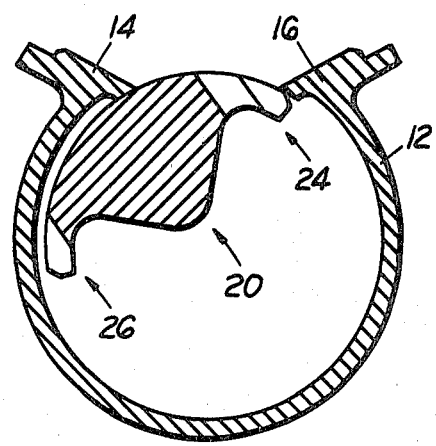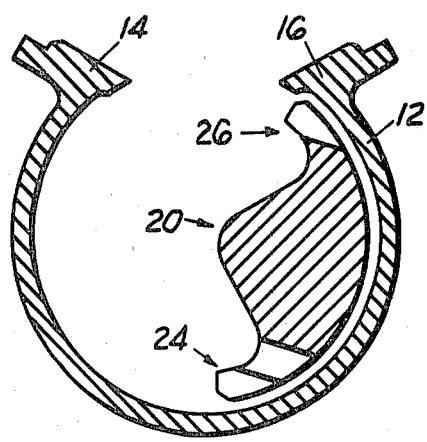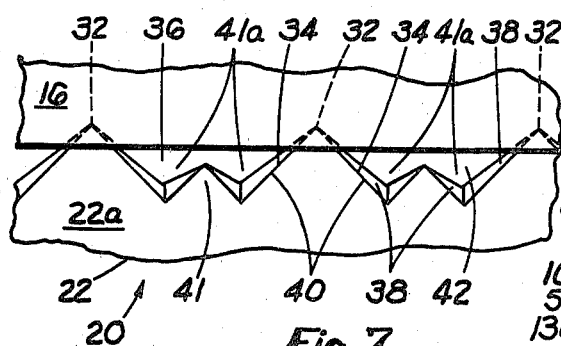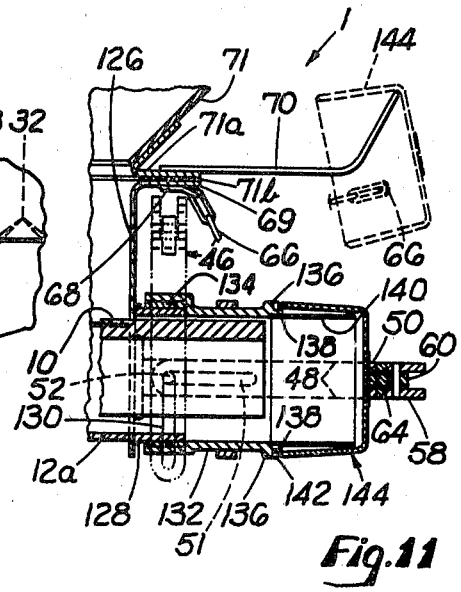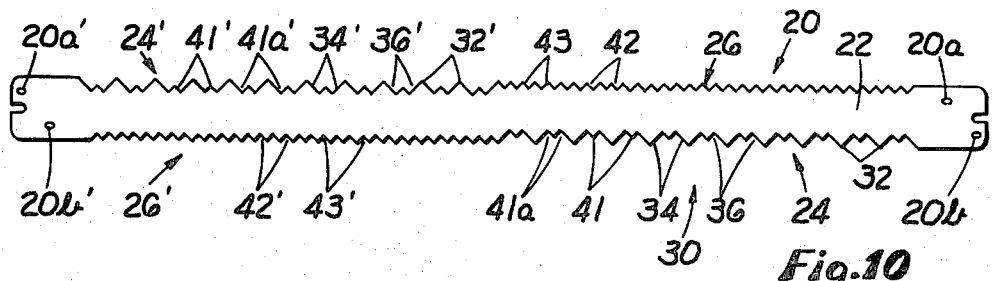

PNEUMATIC OUTLET CONTROL VALVE

FIELD OF INVENTION

This invention relates to pneumatic outlets to unload lading from transportation vehicles and storage containers.

BACKGROUND OF THE INVENTION

U.S. Pat. No. 3,778,114 granted Dec. 11, 1973 discloses a pneumatic outlet including an arcuate segment control valve located in the discharge tube. In closed position the control valve closes an opening between the lower inner edges of sloping outlet side walls. The control valve comprises an arcuate segment of approximately 270°, and includes contoured openings to control the application of vacuum suction to the lading being unloaded. The control valve is rotatable to a position within the tube to allow lading to enter the tube.

However, with hard plastic pellets such as acrylic resins, high density face cut polypropylene, and face cut polystyrene, a problem has developed in operation of the outlet. When the valve is rotated to the full open position with hard lading in the tube, and is then rotated in the same direction to the closed position, hard pellets may become trapped between the control valve and the tube wall. When this occurs the pellets tend to bend the control valve outward. When the control valve is bent in this manner the control valve tends to abut one or both lips located at the base of the hopper walls which define the opening into the discharge tube. While back and forth rotation of the control valve, rather than rotation in one direction, tends to minimize this problem, the problem still exists to some degree with back and forth rotation. Instructions to outlet attendants to use back and forth rotation are not always followed during commercial unloadings.

A related problem with the control valve in U.S. Pat. No. 3,778,114 is that the contour of openings in the control valve includes relatively deep valleys separated by flat land portions. The deep valleys tend to collect and trap pellets located between the valve and the seat or lip. These pellets are then moved with the control valve when it is further rotated to open position and are trapped between the valve and the tube wall. Such pellets then tend to cause bending of the control valve as described hereinabove.

It is also believed that the large arcuate segment of 270° makes complete wash-out of the outlet more difficult. Furthermore, outlets because of their location on the bottom of hopper cars, are subjected to damage from foreign objects laying on the road bed. When the discharge tube is damaged on outlet covered in U.S. Pat. No. 3,778,114 the control valve often will not rotate, therefore the outlet cannot be opened and the car must be unloaded from the hatch opening.

SUMMARY OF THE INVENTION

The object of the invention is to provide a pneumatic outlet which avoids the tendency for hard pellets to become trapped between the control valve and the metering openings and thus render the control valve difficult or impossible to rotate.

Another object of the invention is to provide a pneumatic outlet which tends to more easily result in complete wash-out of the lading from the discharge tube during cleaning.

Another object is to provide a pneumatic outlet which is easy to inspect.

Another object of the invention is to provide a control valve that can be rotated from full open to closed position without difficulty when being used with existing, hard pellets.

Another object is to provide a control valve which can satisfactorily meter the lading by operating only in the upper portion of the discharge tube and will operate when the bottom of the discharge tube has been impacted.

In accordance with the present invention, in a pneumatic outlet a discharge tube is attached to sloped outlet walls having lips at their lower inner edges. An arcuate rotatable control valve is located within the discharge tube.

The control valve is provided with a leading edge having a pattern of openings for metering flow of lading into the discharge tube and is arranged to reduce or eliminate pellets from becoming trapped in the valve opening. The metering contour includes a pattern of sharp edges and recesses. The tapered recesses are arranged to guide pellets away from the valve opening. The sharp edges will shear the remaining pellets which are trapped in the metering opening, thus avoiding jamming the control tube. Preferably, the contour includes alternate sharp edges and recesses.

The control valve further comprises arcuate segment of less than 180°. With this arcuate segment any pellets trapped between the control valve and the wall of the tube tend to bend the control valve away from the lips and thus reduce any tendency for the control valve to become bound and unrotatable because the control valve abuts one of the lips.

Furthermore, since the control valve is located in the upper portion of the discharge tube, the control valve can be operated when the lower portion of the discharge tube has been impacted and deformed.

Preferably, the leading edge includes a plurality of laterally spaced projections defined by converging formed surfaces extending outwardly from a control valve body portion. Adjacent formed surfaces define slots or recesses between the control valve projections. Preferably, the projections are of relatively short lateral extent. Preferably, the converging surfaces are tapered with respect to the vertical in a direction such that the converging surfaces direct lading away from the control valve. In addition, the juncture of the tapered surface with the upper surface of the control valve provides a relatively sharp edge which is effective to shear pellets which have not been pushed away by the tapered surface. Preferably, at least one second or rear projection is provided between the longer first recited projections of reduced arcuate extent to direct any particulate matter congregated in the opening between the lips during metering.

IN THE DRAWINGS

FIG. 1 is a plan view of a prior art pneumatic outlet with which the present invention can be utilized.

FIG. 2 is a detail plan view of the prior art control valve utilized in FIG. 1.

FIG. 3 is a vertical sectional view looking in the direction of the arrows along the line 3—3 in FIG. 1, and illustrating lading located between the discharge conduit and the control valve, forcing the control valve into abutting relationship with one of the lips of the discharge conduit.

FIG. 4 is a view similar to FIG. 3 illustrating a still more severe condition wherein the control valve abuts both lips of the discharge tube.

FIG. 5 is a vertical sectional view of the control valve of the present invention.

FIG. 6 is a detail perspective view illustrating the leading edge contour for metering lading into the discharge tube.

FIG. 7 is a detail plan view of a portion of FIG. 6 illustrating tapered surfaces on the first projections and second projections located between the first projections.

FIG. 8 is a vertical sectional view with the control valve located in a metering position.

FIG. 9 is a vertical sectional view of the control valve in the full open position for clean-out.

FIG. 10 is a plan view of the control valve of the present invention illustrating a pair of leading edge portions and a pair of trailing edge portions located respectively on opposite sides of the outlet.

FIG. 11 is a vertical sectional view looking in the direction of the arrows along the line 11—11 in FIG. 1 and illustrating mounting the end portions of the control valve within the discharge conduit.

DETAILED BACKGROUND

The control valve described and illustrated in U.S. Pat. No. 3,778,114 (hereby incorporated into the present application by this reference) is illustrated in FIGS. 1-4 and 11 of the drawings. In FIG. 1 it is seen that in a pneumatic outlet 1, a control valve 10 is located in a discharge conduit 12 extending between downwardly extending lips 14 and 16 of the side walls 14a and 16a. However, a quantity of particulate material 17 is illustrated in FIG. 3 as being located between the control valve arcuate segment body portion 10 and the discharge conduit. The material 17 became located in this position because in the control valve 10 constructed according to the teachings of U.S. Pat. No. 3,778,114 at least the deep valleys 18a, 18b and 18c tend to trap particles as the control valve is rotated into a position in which the leading edge passes below one of the lips 14 or 16. Furthermore, the portions 19 between adjacent valleys 18a, 18b and 18c are not sufficiently tapered in the horizontal direction to direct particles away from the leading edge and prevent them from being trapped between the leading edge and one of the lips 14 and 16. Furthermore, the control valve in U.S. Pat. No. 3,778,114 contains no taper in the vertical direction which tends to direct lading upwardly and away from the control valve and lip.

It is seen that in FIG. 3 the control valve 10 abuts the lower inner end of the lip 16, because the particulate material 17 has forced the control valve outwardly. When this occurs the control valve 10 cannot be rotated further in a clockwise direction. Furthermore, rotation of the valve in a counterclockwise direction is likely to result in the more aggrevated situation illustrated in FIG. 4 wherein the ends 10a and 10b of the control valve abut the respective lips 14 and 16. In this event, the trapped particulate material 17 is applying a sufficient force to prevent the control valve from being moved to the closed position. Thus the problem of the particulate material 17 being located between the control valve 10 and the discharge conduit 12 is a serious disadvantage of the construction shown in U.S. Pat. No. 3,778,114.

In addition, if the discharge conduit is impacted in the lower portion 12a by an obstruction on the track, the close proximity of the control valve 10 together with its need to be appropriately spaced from the entire internal surface 12b of the discharge conduit 12 results in a situation whereby the control valve in many cases cannot be rotated in one or both directions and is totally inoperative after impact of the discharge conduit in the lower portion.

DESCRIPTION OF PREFERRED EMBODIMENTS

As illustrated in FIG. 5, the control valve 20 of the present invention comprises an arcuate segment of less than about 180°. The control valve 20 further is located in the upper one-half part of the discharge conduit 12, above the centerline C-L. Thus one of the disadvantages of U.S. Pat. No. 3,778,114 is overcome in accordance with the present invention by providing a control valve 20 having a reduced arcuate segment as illustrated in FIG. 5, which is located in the upper one-half of the discharge conduit above center line C-L.

The control valve 20 includes an arcuate body portion 22 having a leading edge 24 and a trailing edge 26. The leading edge includes a pattern 30 designed to reduce or eliminate the trapping of particulate material between the control valve and the discharge conduit 12. This pattern 30 comprises a plurality of outwardly extending projections 32 which are laterally spaced apart.

The plurality of laterally spaced projections or lands is defined by converging, formed surfaces 34 extending outwardly from the control valve body portion 22. Adjacent formed surfaces define slots or recesses 36 between the control valve projections. Preferably the projections or lands are of relatively short lateral extent. Preferably the converging surfaces are tapered with respect to the vertical, as indicated at 38, in a direction such that the converging surfaces direct lading away from the control valve. In addition, the juncture lines 40 of the tapered surface with the upper surface 22a of the control valve provides a relatively sharp edge which is effective to shear pellets which have not been pushed away by the tapered surface. Preferably at least one second or rear projection or land 41 is provided between the longer first recited projections 32 of reduced extent to direct any particulate matter congregated in the openings 36 during metering of the lading during unloading. Projections 41 define recesses 41a on either side thereof for initial discharge of lading as shown in FIG. 7.

FIG. 8 shows the position of the control valve in the metering position in which particulate lading flows through the discharge opening 10 through the slots or recesses 36 and into the discharge tube 12 where it is conveyed by vacuum suction to an adjacent container (not shown).

FIG. 9 shows the control valve 20 in the full open position wherein the discharge opening 10 is completely unobstructed during clean-out of the lading from the outlet at the end of the unloading operation.

As is apparent from FIG. 2, each side of the outlet is preferably provided with a leading edge portion and a trailing edge portion. Thus as shown in FIG. 10, the control valve 20 includes first a leading edge portion 24 on a first side of the outlet and a second leading edge portion 24' on the opposite or second side of the outlet.

Finally the control valve includes a trailing edge portion 26 on a first side of the outlet, and a second trailing edge portion 26' on an opposite or second side of the outlet. Leading edge 24' includes the same pattern 30' as leading edge 24 including projections 32', recesses 36' and second projections 41'. Trailing edge 26' includes projections 42' and recesses 43'.

Control valve 20 includes openings 20a and 20b at either end to attach the control valve to operating handles 74. End walls 126 connect the ends of side slope sheets 14a and 16a. Fixed to each end wall 126 is an end ring 128. The inner surface 130 of end ring 128 is flush with the inner surface or bottom 12a of discharge conduit 12 to form a smooth continuation thereof as shown particularly in FIG. 11. A sleeve 132 is mounted on each bearing 134 which extends about end ring 128. Sleeve 132 rotates freely about end ring 128. A circumferential rim 136 is provided on the other end of sleeve 132. An inner groove 138 receives an adapter fitting 140 to which a pneumatic hose or conduit (not shown) may be connected for the pneumatic discharge of the lading from discharge conduit 12. A gasket 142 is positioned on the outer end of circumferential rim 136 and a removable end cap generally indicated 144 may be positioned over adapter 140 adjacent gasket 142.

The control valve 20 is operated in the manner described in U.S. Pat. No. 3,778,114. Briefly, for securing end cap 144 in position, a ball generally indicated 46 is provided having parallel arms 48 connected by a body 50. Arms 48 have slots 51 receiving pins 52 in brackets 54 secured to end wall 126. A bracket 58 on body 50 has a handle 60 pivotally mounted thereon about pivot 62. Handle 60 has a cam 64 adjacent one end thereof which is adapted to contact the outer surface of end cap 144. A chain 66 is connected to the sides of end cap 144 and is anchored at 68 to the underside of circumferential flange 69. A strap or hanger 70 is secured to the upper surface of flange 71a extending from hopper 71 and extends outwardly as shown in FIG. 11 to provide a support for cap 144 when the cap is removed from the end of pneumatic outlet 1. As shown in FIG. 11, a seal 71b is located between flanges 69 and 71a.

To remove cap 144 from its closed position for discharge of lading, handle 60 is first rotated to release cam 64 from tight engagement with cap 144. In this position, ball 46 is pivoted upwardly to the position shown in FIG. 11 with ball 46 slipping downwardly with slots 51 riding along pins 52. In this position, cap 144 may be removed and placed on hanger 70 as shown in FIG. 11 in broken lines.

In operation of the outlet, normally, discharge of lading is first commenced from the remote portion of the outlet with respect to the discharge end of the outlet. Then, lading from the adjacent portion of the outlet is discharged. Thus, as shown in FIG. 7, valve member 20 is opened slightly for an initial discharge of lading through recesses 42 between secondary projections 41. After the lading discharge has been commenced, valve member 20 may next be rotated to the position shown in FIG. 8 and then, depending upon the type of lading and the discharge pressure, to a full open position as shown in FIG. 9. When it is desired to unload from the remaining one-half of the outlet, valve member 20 may be rotated in an opposite direction to achieve the same sequence of opening.

As end portions 20a, 20b; 20a', 20b' of valve member 20 are secured to rotatable sleeves 132 in a suspended position, no lower bearing surfaces are required for valve member 20. Thus, end ring 128 may have its inner surface 130 flush with the inner surface of discharge conduit 12 since no support has to be provided by end rings 128 for valve member 20. The entire bottom of discharge conduit 12 is unobstructed and lading does not collect in the bottom 12a to interfere with the rotation of valve member 20. A very effective clean-out of the outlet structure is provided upon unloading.

What is claimed is:

1. A pneumatic outlet comprising: a discharge tube attached to sloping outlet walls having lips at their lower inner edges; a rotatable control valve located within said tube; said control valve comprising arcuate segment of less than 180°; at least the leading edge portion of the control valve having a contour of openings for metering flow of particulate lading into the discharge tube which tends to prevent particulate lading becoming trapped between the control valve and the discharge tube; said contour including a plurality of laterally spaced projections defined by converging, formed surfaces extending outwardly from a control valve body portion; said adjacent formed surfaces defining metering slots or recesses between said control valve projections; said converging surfaces being tapered with respect to the vertical in a direction such that the converging surfaces direct lading away from the control valve.

2. A pneumatic outlet according to claim 1, wherein the projections are of relatively short lateral extent.

3. A pneumatic outlet according to claim 1, wherein the juncture of the tapered surface with the upper surface of the control valve provides a relatively sharp edge which is effective to shear pellets which have not been pushed away by the tapered surface.

4. A pneumatic outlet according to claim 3, including at least one second or rear projection located between the longer first recited projections of reduced lateral extent to direct particulate matter congregated in the opening between said lips during metering.

5. A pneumatic outlet according to claim 1, wherein the juncture of the tapered surface with the upper surface of the control valve provides a relatively sharp edge which is effective to shear pellets which have not been pushed away by the tapered surface.

6. A pneumatic outlet according to claim 5, wherein at least one second or rear projection is provided between the longer first recited projections of reduced lateral extent to direct any particulate matter congregated in the opening between the lips during metering.

7. A pneumatic outlet according to claim 1, wherein said control valve includes a trailing edge having a contour for controlling the flow of particulate lading into said discharge tube.

8. A pneumatic outlet according to claim 7, wherein said control valve includes a pair of said leading edges on opposite sides of said outlet.

9. A pneumatic outlet according to claim 8, wherein said control valve includes a pair of said trailing edges on opposite sides of said outlet.

10. A rotatable control valve comprising: an arcuate segment of not more than about 180°; said arcuate segment comprising a body portion and a leading edge extending outwardly on at least one side of said body portion; at least said leading edge having a contour of openings for metering flow of particulate lading into a discharge tube which tends to prevent particulate lading becoming trapped between the control valve and a discharge tube; said contour including a plurality of laterally spaced projections defined by converging formed surfaces extending outwardly from a control valve body portion; said adjacent formed surfaces defining metering slots or recesses between said control valve projections; said converging surfaces being tapered with respect to the vertical in a direction such that the converging surfaces direct lading away from the control valve.

11. A rotatable control valve according to claim 10, wherein the juncture of the tapered surface with the upper surface of the control valve provides a relatively sharp edge which is effective to shear pellets which have not been pushed away by the tapered surface.

12. A rotatable control valve according to claim 10, wherein at least one second or rear projection is provided between the longer first recited projections of reduced lateral extent to direct any particulate matter congretated in the opening between the lips during metering.

13. A rotatable control valve according to claim 10, wherein said control valve includes a trailing edge having a contour for controlling the flow of particulate lading into said discharge tube.

14. A rotatable control valve according to claim 13, wherein said control valve includes a pair of said leading edges on opposite sides of said outlet.

15. A rotatable control valve according to claim 13, wherein said control valve includes a pair of said trailing edges on opposite sides of said outlet.

* * * * *